(12) United States Patent
Konermann

(10) Patent No.: US 6,474,730 B2
(45) Date of Patent: Nov. 5, 2002

(54) WIND DEFLECTOR FOR A SLIDING ROOF OPENING OF A MOTOR VEHICLE

(75) Inventor: Martin Konermann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/988,015

(22) Filed: Nov. 16, 2001

(65) Prior Publication Data

US 2002/0063446 A1 May 30, 2002

(30) Foreign Application Priority Data

Nov. 16, 2000 (DE) .......................... 100 56 754

(51) Int. Cl.[7] ................................................. B60J 7/22
(52) U.S. Cl. ...................................................... 296/217
(58) Field of Search ........................................ 296/217

(56) References Cited

U.S. PATENT DOCUMENTS 5,431,477 A * 7/1995 Smith et al. ................ 296/217
5,671,970 A * 9/1997 Edelmann ................... 296/217
6,086,146 A * 7/2000 Nabuurs ..................... 296/217
6,227,613 B1 * 5/2001 Maciejewski ............... 296/217

FOREIGN PATENT DOCUMENTS

DE         4012569           5/1991

* cited by examiner

Primary Examiner—Dennis H. Pedder
(74) Attorney, Agent, or Firm—Crowell & Moring LLP

(57) ABSTRACT

A wind deflector for a sliding roof opening of a motor vehicle having a projected wind deflector profile that is raised in relation to the front roof cutout edge and that experiences the flow-through of the air flow during travel when the sliding roof is open. The deflection profile is equipped on one face side with a series of air inlet ports, arranged over its breadth, and with air outlet ports on an adjacent profile side. The wind deflector profile is realized as a hollow section, and air outlet ports are distributed across the upper boundary wall of the wind deflector profile.

8 Claims, 2 Drawing Sheets

WIND DEFLECTOR FOR A SLIDING ROOF OPENING OF A MOTOR VEHICLE

BACKGROUND AND SUMMARY OF THE INVENTION

This application claims the priority of German Patent Application Document 100 56 754.1, filed Nov. 16, 2000, the disclosure of which is expressly incorporated by reference herein.

The invention relates to a wind deflector for a sliding roof opening of a motor vehicle.

A wind deflector for sliding roof openings of a motor vehicle is known from German Patent DE 40 12 569 C1. When the sliding roof is open, the wind deflector section projects above the front roof cutout edge so that the air flow moving across the roof's surface is deflected by the raised wind deflector profile. Appropriately constructed air inlet and air outlet ports, distributed over the breadth of the wind deflector section, create turbulence behind the wind deflector profile, preventing undesirable low frequency vibrations such as, for example, the so-called whumping.

However, if sliding roof openings of motor vehicles are designed for larger surface areas, the measures for suppressing whumping, as represented in German Patent DE 40 12 569 C1, may not be sufficient. Moreover, the arriving air flow may not be whirled up strongly enough in order to suppress whumping in motor vehicles that have large interior volumes, as e.g. combination motor vehicles.

Consequently, the present invention provides an improved wind deflector, which keeps the interior of the vehicle free from drafts and whumping sounds can be suppressed even for large interior volumes of vehicles and large-surface sliding roof openings.

The partial flows, entering through the air inlet ports on a face side of the wind deflector profile, are redirected inside the hollow section and exit through the air outlet ports, which perforate the upper boundary wall, at a rather high rate of speed and almost perpendicular in relation to the main flow. This causes turbulence to form above the wind deflector profile allowing for selective influencing of flow across the roof in the area of the sliding roof opening.

Due to the low pressure that is in effect above the air outlet ports, air is also sucked out of the vehicle interior through the hollow section that is open on its bottom side.

The turbulence can be modified by equipping the wind deflector profile along its profile extension in the crosswise direction of the vehicle with elevations and recesses, so-called turbulence notches. Using an appropriate combination, the height of the wind deflector can be reduced so that less structural space is required.

A central arrangement of the air inlet ports between the roof cutout edge and the upper boundary wall of the wind deflector profile allows for the optimal use of dynamic pressure.

In a preferred embodiment, the air inlet ports are distributed on the front face wall of the wind deflector profile.

Depending on the type of roof or sliding roof opening, it can also be advantageous to close the hollow section that is open on its bottom side with a closing plate.

In accordance with the pressure conditions, it is also possible to envision air inlet ports on the rear face side of the wind deflector profile.

If air outlet ports are arranged on the highest points in the area of the elevations of the wind deflector profile, the main flow that moves over the wind deflector profile can be deflected upward to an amplified degree, thereby allowing the bridging of especially large-surface sliding roof openings.

Other objects, advantages and novel features of the present invention will become apparent from the following detailed description of the invention when considered in conjunction with the accompanying drawings.

BRIEF DESCRIPTION OF THE DRAWINGS

Further advantageous designs of the invention are explained on the basis of the drawings.

DETAILED DESCRIPTION OF THE PREFERRED EMBODIMENT

Figure 1:
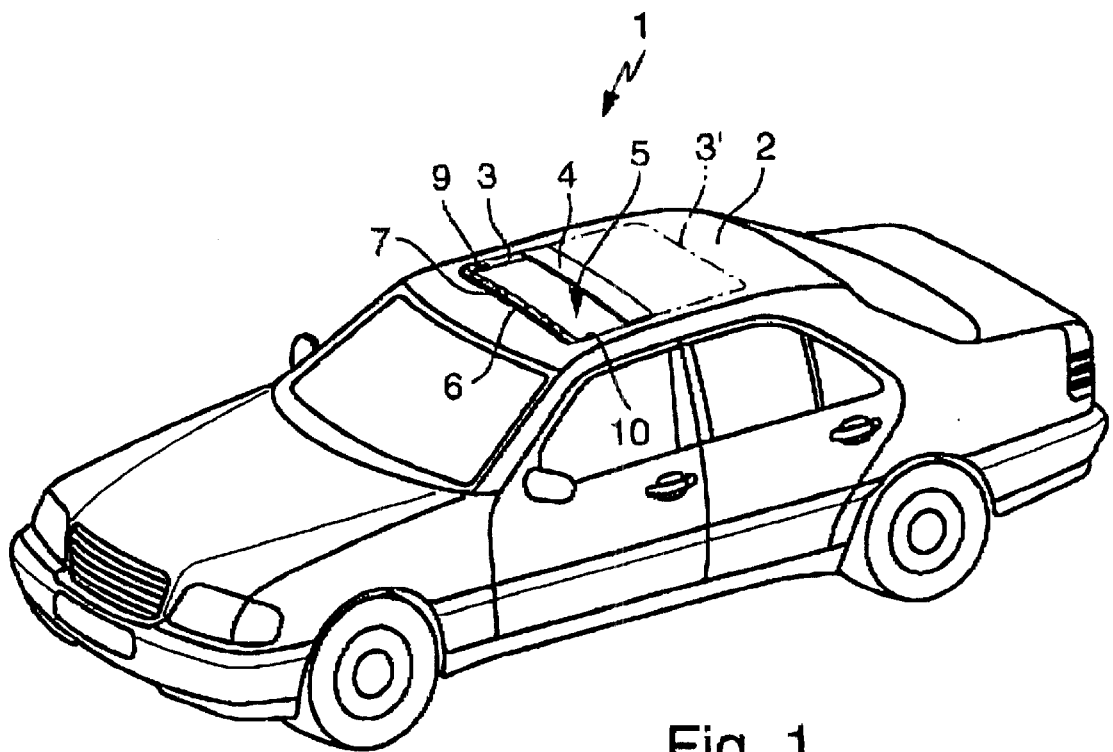
FIG. 1 is a survey representation of a motor vehicle at an oblique front view.

FIG. 1 depicts a motor vehicle 1, represented as a sketch, whose upper roof area 2 has a rectangular roof cutout 3 that can be closed by a sliding roof 4. In order to avoid having the air stream, which moves along the roof area 2, from penetrating the interior 5 through the roof cutout 3 as uncontrollable air whirls, a wind deflector 7 is arranged on the front roof cutout edge 6, whose lengthwise-extended wind deflector profile 8 projects, rising above the roof surface 2, in front of the roof cutout 3. The wind deflector 7 has a U-shape, and the molded bars 9 and 10 are linked crosswise in relation to the wind deflector profile 8 to the lateral roof cutout edges. During closing, the sliding roof 4 slides along bars 9 and 10 and thus moves the wind deflector 7 to beneath the roof surface 2 until the roof cutout 3 is completely closed by the sliding roof 4.

Figure 2:
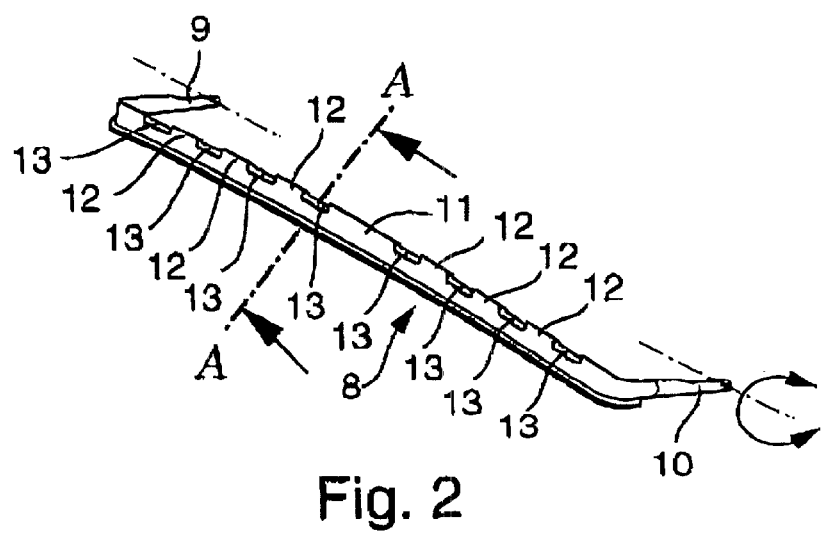
FIG. 2 shows the wind deflector in accordance with FIG. 1 in a single representation and at an oblique front view.

The apparatus and functioning of the wind deflector will now be explained on the basis of FIG. 2. The wind deflector profile 8 has on its upper boundary wall 11 several elevations 12, which are arranged adjacent to each the other and separated from one another by recesses 13 located between them. The surface structure of the wind deflector profile 8, also designated as turbulence notches, cause direction-oriented and high frequency swirls behind the wind deflector 7, thereby reducing the quantity of air swirls that penetrate the vehicle interior 5.

With larger roof cutouts 3', as represented by the dotted-dashed line, the turbulence notches which are characterized by elevations 12 and recesses 11 may not suffice to suppress whumping noises.

Figure 3:
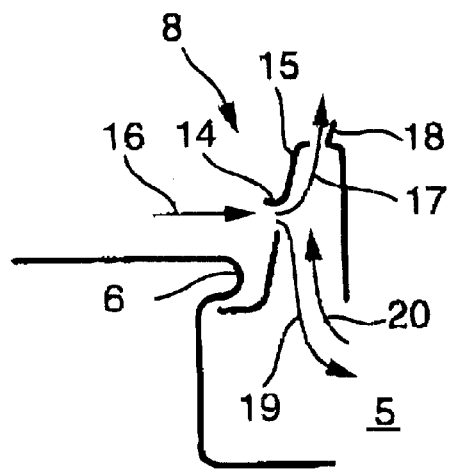
FIG. 3 shows the wind deflector profile in a sectional view in accordance with line A—A in FIG. 2.

As is apparent from the sectional representation in FIG. 3, the wind deflector profile 8 that is realized as elevated and rising in relation to the front roof cutout edge 6 is constructed as a hollow section. Air inlet ports 14 are provided on the front face side 15 across the breadth of the wind deflector profile 8, and a partial flow of the air stream 16, which moves along the roof surface 2, flows through them into the hollow section. Due to the pressure conditions that are prevalent at any given time above and below the wind deflector profile 8, the incoming flow is deflected in an upward direction corresponding to the arrow 17 toward the air outlet ports 18 in the upper boundary wall 11 and/or in a downward direction corresponding to arrow 19 toward the vehicle interior 5. In addition, air from the vehicle interior 5 can be sucked in an upward direction in accordance with arrow 20. The swirls that are created in this way above the wind deflector profile 8 cause the excursion of the air stream 16 across the entire roof cutout 3, allowing for the effective suppression of whumping noises.

In accordance with the demands placed upon the wind deflector and depending on the respective roof cutout as well as the volume of the vehicle interior, the air inlet ports can be arranged at various positions, and the hollow section of the wind deflector profile can be realized correspondingly.

Figure 4:
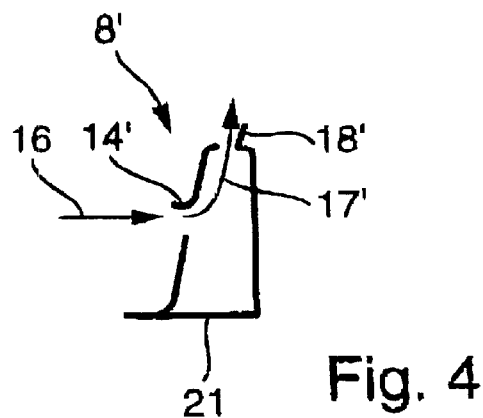
FIG. 4 illustrates a first alternative embodiment of the wind deflector profile.

In an embodied example in accordance with FIG. 4 the wind deflector profile 8' is closed with a closing plate 21 causing the partial flow 17', that penetrates the wind deflector profile 8', only to be deflected in an upward direction exiting through the air outlet ports 18' that are likewise arranged on the upper boundary wall 11'.

Figure 5:
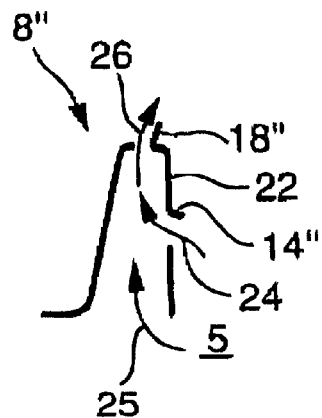
FIG. 5 illustrates a second alternative embodiment of the wind deflector profile.

In another embodied example in accordance with FIG. 5 air inlet ports 23 are provided on the rear face wall 22 of the wind deflector profile 8" through which a partial flow, characterized respectively by arrow 24, enters the hollow cross section. At the same time, air is moved, due to the prevailing low pressure conditions, by way of the wind deflector section 8" from the vehicle interior 5 in the direction of the arrow 25, exiting at a relatively high speed from the air outlet ports 18" in the direction of the arrow 26, thereby generating air swirls above the wind deflector profile.

The air inlet and outlet ports are distributed over the entire breadth of the wind deflector profile in order to influence the through-flow of the wind deflector profile in an organized way. The geometry of the air inlet and/or air outlet ports can be realized, respectively, in accordance with the flow conditions and feature, for example, round or angular cross sections or slots. The arrangement of air outlet ports for wind deflector profiles with turbulence notches can be in the area of the recesses or the elevations. The higher an air outlet port is arranged on the wind deflector profile, the more protracted is its influence upon the flow across the roof.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wind deflector for a sliding roof opening of a motor vehicle having a projected wind deflector profile that is raised in relation to a front roof cutout edge when the sliding roof is open;

said deflector profile provided on one face side with a series of air inlet ports, arranged over a breadth of said profile, and with air outlet ports on an adjacent profile side, and wherein the wind deflector profile is formed as a hollow section, with an upper boundary wall of the wind deflector profile being perforated with air outlet ports.

2. The wind deflector according to claim 1, wherein the wind deflector profile has a hollow cross section that is open on one side toward a bottom side of the profile, and a front face side extends as rising toward a rear of the vehicle.

3. The wind deflector according to claim 2, wherein the wind deflector profile has elevations along its profile section in a crosswise direction of the vehicle, which are set at a distance from one another by way of contiguously arranged recesses.

4. The wind deflector according to claim 3, wherein the air inlet ports are arranged between a front roof cutout edge and an upper boundary wall, approximately in the center of the face side of the wind deflector profile.

5. The wind deflector according to claim 4, wherein the air inlet ports that are distributed over the breadth of the wind deflector profile perforate the front face side.

6. The wind deflector according to claim 5, wherein the wind deflector profile, which is open toward one side on its bottom side, is closed by a closing plate.

7. The wind deflector according to claim 4, wherein the air inlet ports distributed over the breadth of the wind deflector profile perforate a rear face side.

8. The wind deflector according to claim 4, wherein the air outlet ports in the area of the elevations perforate the upper boundary wall of the wind deflector profile.

* * * * *